July 27, 1937.  J. Y. BLAZEK ET AL  2,088,362
MEASURING DEVICE
Filed Aug. 4, 1933

Inventors
J. Y. Blazek
and
R. G. Anderson
By C. F. Heinkel
Attorney

Patented July 27, 1937

2,088,362

UNITED STATES PATENT OFFICE 2,088,362

MEASURING DEVICE

John Y. Blazek, Maple Heights, and Russell G. Anderson, Cleveland, Ohio, assignors to Lempco Products, Inc., Bedford, Ohio Application August 4, 1933, Serial No. 683,632

6 Claims. (Cl. 33—178)

The present invention relates to measuring means wherein a measuring instrument is used.

Objects of the present invention are:

To provide a measuring device which has a minimum of weight to facilitate the measuring feeling of a user of the device.

To provide such a device with a handle so that the same can be conveniently applied and used in deep spaces without an operator's arm closing up the major part of the space.

To provide such a device with a direct reading measuring instrument so that a user of the device can always see and read the divisions on the instrument without first removing the device from the space even when the same is located in the deeper parts of spaces.

To provide such a device with a measuring means which is always face up so that the same can be read in any position thereof in a space and from the direction at which the same was inserted in the space.

To locate the above mentioned handle on the base in such a manner that the gravity of the base and the measuring instrument always tends to retain the same in measuring position irrespective of the relation of the handle of the device to the base and measuring instrument.

To provide such a device with adjusting or exchange means to adapt the same to variously sized spaces.

Other objects will be pointed out in this description or will become obvious or apparent or will suggest themselves upon an inspection of the drawing and this description.

In measuring devices of the prior art, a great disadvantage exists in that, during measuring a space, the measurer must take hold of the measuring device with his hand to move the same into the space for measuring thereof. The hand and arm of the measurer practically closes the major portion of the space and the measuring instrument can not be read even when a direct reading instrument is used.

When the usual micrometer gages or instruments are used, it is necessary to insert and remove the instrument repeatedly and adjust the same by guessing until the size of the space is ascertained. This is a great time consuming procedure which is eliminated in the present invention.

The present invention provides a handle on the measuring instrument and mounts the same pivotally on the measuring instrument or on the supporting means thereof so that the handle can be swiveled into various angular relations with the measuring instrument without disturbing the reading thereof.

The present invention then, broadly speaking, contemplates a direct reading measuring instrument, a handle for the measuring instrument, an articulate relation between the handle and the instrument, an ever present balanced condition of the measuring instrument relative to the handle, adjustable or exchangeable means to adapt the measuring instrument to various widths of spaces, and to make the device of a minimum of weight.

The present invention is illustrated in one embodiment in the accompanying drawing, forming part of this specification. It is, of course, quite obvious that the present invention can be adapted to other embodiments within the spirit and intent and scope of the appended claims.

In the accompanying drawing mentioned above:

Similar reference characters refer to similar parts throughout the views.

Figure 1:
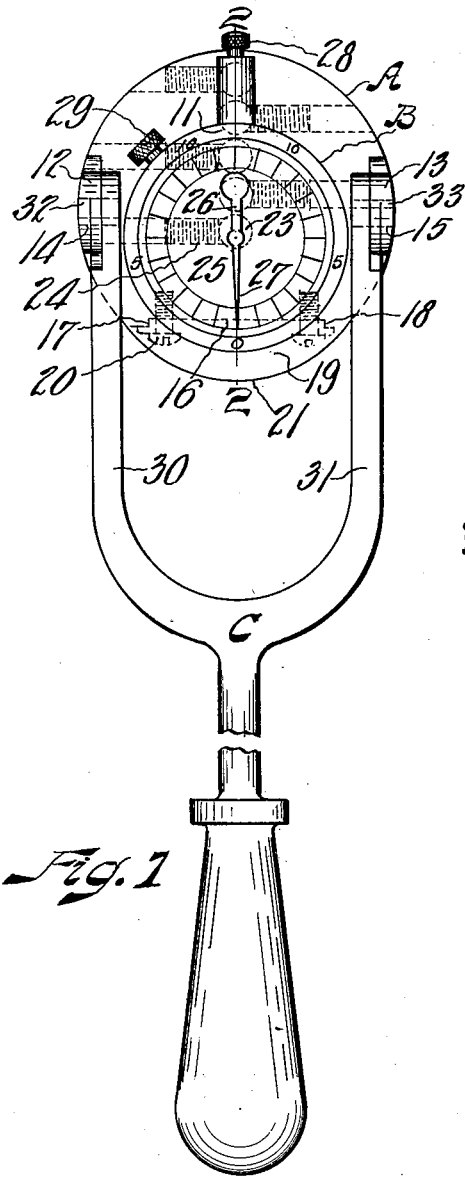
Fig. 1 is a plan view of a measuring device showing the handle as pivoted to a parallel relation with the dial which faces upwardly.
Figure 2:
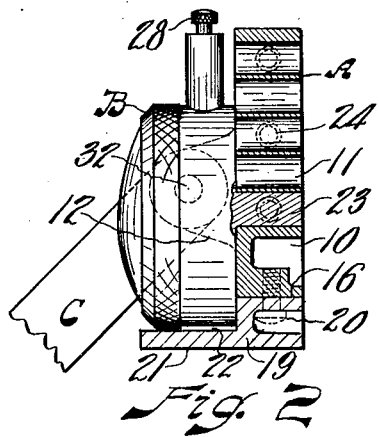
Fig. 2 is a section taken on line 2—2 of Fig. 1 and shows structure more clearly.
Figure 3:
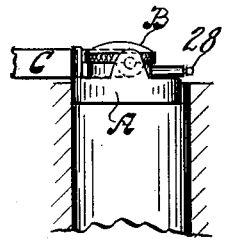
Fig. 3 is a sectional view of a part of a cylinder with the measuring device first inserted into the top thereof and the handle substantially at right angles to the cylinder. The contact member is here shown as projecting beyond the wall of the bore and is to be pushed in manually so that the device can enter fully into the bore.
Figure 5:
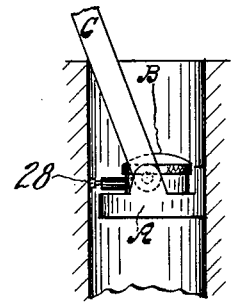
Fig. 5 is a sectional view of a cylinder showing the measuring device moved part way through the bore and the handle pivoted to contact the upper edge of the bore.
Figure 4:
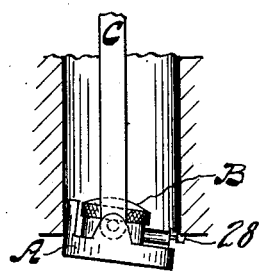
Fig. 4 is a sectional view of a cylinder showing the measuring device moved through the bottom thereof and the contact member extending beyond the wall of the bore.
Figure 6:
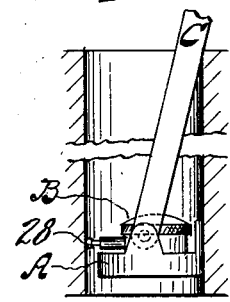
Fig. 6 is a sectional view of a cylinder and the measuring device moved nearly to the bottom of the bore and the handle pivoted to one side as far as the wall of the bore will let it.

The measuring device shown in the accompanying drawing, mentioned above, is specifically described herein below and comprises, principally, the base A, the measuring instrument B thereon, and the handle C pivotally mounted on the base.

The base A is made of a minimum of weight either by cutting away portions thereof or making the same of such materials as aluminum or aluminum alloy, or magnesium, or beryllium to facilitate the measuring feeling of a user of the device.

The body part 10 of the base has a series of instrument locating holes 11 through the same to receive the below described pilot or locating element of the instrument B so that the same can be shifted on the base from one hole 11 to another, to adapt the device for differently sized spaces.

The ears 12 and 13 are upstanding from opposite sides of the part 10 and have the pivot holes 14 and 15 through the same respectively near the upper end thereof for purposes appearing herein below.

One side of the part 10 has the flat face 16 terminating at the shoulders 17 and 18.

In the present instance, the bracket 19 is located on the part 10 by the face 16 and is centralized by the shoulders 17 and 18 and is held onto the part 10 by the screws 20. The abutment strip 21 is hardened and ground and traverses the part 10 and extends above the same to provide a long bearing face thereon for abutment on the surface to be measured and alinement of the base and the measuring instrument thereon at right angles to the surface to be measured.

The bracket 19 may be made integral with the base and the strip 21 inserted therein when the material of the base does not permit of hardening thereof. It is to be noted that the curvature of the outer surface of the bracket 19 and of the strip 21, when used, is of less radius than the radius of the base, as is illustratively shown in Fig. 1, so that only a single line contact of the bracket or the strip on the wall of a bore is attained and the sides of the bracket or the strip are always out of contact with the wall of the bore so that measurement can be made exactly across the diameter of the bore.

Suitable clearance 22 is provided in the bracket 19, or in the corresponding part of the base to allow a projecting part of the measuring instrument to move freely.

The measuring instrument B rests on the top of the part 10 and has the locating and centralizing pin or pilot 23 projecting from the lower face thereof to be inserted into any one of the instrument locating holes 11 to vary the relation of the instrument to the base for different widths of space. The screws 24 are tapped into the part 10 and abut the pilot 23 to hold the instrument B in axial and unrotative relation to the part 10.

The measuring instrument B has the dial 25 graduated to a convenient standard of measurements and has a finger 26 with the pointer 27 thereon and adapted to travel arcuately over the graduations to show, for direct reading, the amount of variation on one side or the other of the zero mark on the dial.

The contact and pointer operating member 28 extends out of and beyond the casing, diametrically opposite the abutment strip 21 and is spring pressed to move axially and is moved axially outwardly of the casing by external contact or endwise pressure brought thereon and thereby operates mechanism in the casing which transmits the axial movement of the member 28 into rotative movement of the pointer 27.

The member 29 is a part of the interior mechanism of the measuring instrument and projects from a side of the casing so that the pointer can be adjustably rotated to bring the same to the zero mark to set the instrument itself for a standard measurement. A notable feature of the present device is that the abutment strip 21 and the contact member 28 are diametrically opposite and can easily and conveniently be reached and contacted by a micrometer or gage for easy and convenient measuring and setting of the measuring instrument by means of the member 29.

Minimum weight is also a desirable feature in the measuring instrument which is attained by making the parts of the instrument of light weight material or reducing the bulk thereof or both.

The handle C, also of light weight material or reduced in bulk, or both, to attain minimum weight thereof, has a forked end comprising the parallel prongs 30 and 31 each inwardly adjacent to the upper ends of the ears 12 and 13 respectively. The pivot pins 32 and 33 extend through the respective ears and prongs. The handle C can swivel nearly all around the axes of the pivot pins 32 and 33. However, the prongs can be spaced sufficiently far apart so that the ends thereof contact the outside of the ears 14 and 15, respectively, and the handle can swivel all around these axes if so desired. However, we prefer that no part of the handle projects beyond the outer surface of the part 10 so as not to interfere with inserting the device into a space.

The instrument locating holes 11 and the abutment strip 21 and the contact member 28 are all in alinement and the axes of the pivot pins 32 and 33 are also in alinement but at right angles to the alinement of the holes and strip and contact member.

The light weight structure of the present invention enables a user of the device to measure a space correctly more easily than when the device is heavier since he does not need to apply so much muscular force to the insertion and manipulation of the device in a space and leaves his muscles more free for feeling thereby of accuracy of measuring and thereby facilitates and increases his measuring feeling.

In the use of the device, the handle is, preferably, first taken hold of to convey the device to the space to be measured. During this conveyance, the axis of the handle may assume any angular relation to the base since the handle is pivoted onto the base at the upper end of the upstanding ears thereof and the pivot is located so that the weight of the mass of the base and instrument thereon will always tend to retain the top of the base and the instrument thereon at least substantially horizontal when the axis of the pivot is horizontal.

Usually a definite distance or width of space, such as the diameter of a cylinder bore, is given. The pilot 23 of the measuring instrument is then inserted into the nearest one of the locating holes 11 and held therein by the corresponding one of the screws 24. A micrometer set to a required width or a gage is then applied over the outside of the abutment strip 21 and the contact member 28. The adjustment member 29 is then manipulated until the pointer registers with the zero mark when the micrometer or gage contacts the abutment strip and the contact member. The device is then set for a space of a definite width.

The part 10 is then inserted into the space with the handle in any angular relation thereto as is indicated in the various views of the drawing. The contact member is resiliently mounted and the same will move outwardly of the instrument casing.

During the first insertion of the part 10 into the space, the abutment strip is abutted against one side of the space and the contact member 28 is pushed in manually until the same can enter the space along with the rest of the device.

If the pointer rests over the zero mark when the device is inserted into the space, the space is of correct size or width. If there is a deviation of the pointer from the zero mark, on one side thereof or on the other, this deviation shows the amount by which the space is too large or too small.

Upon moving the device further into the space, even to the other end thereof, and the pointer does not deviate from its first position, the walls of the space are parallel except when the pointer deviates from its first position at one or more places between the ends of the space which shows that the walls are not parallel.

Upon rotating the device in a space, such as a bore for instance, at any place between the ends thereof and the pointer deviates from its first position, it shows that the bore is not round.

Figure 7:
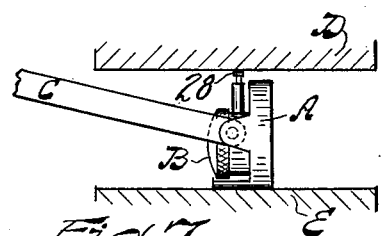
Fig. 7 is a sectional view of two spaced elements with a measuring device between them and the handle also pivoted to clear the view of the dial on the measuring instrument.

When the device is applied to the sidewise spaced elements D and E, of Fig. 7, in the manner described, the sides are parallel if the pointer does not deviate from its first position while the device is moved through the same.

In either case of movement of the device in or through a space, the handle can be moved into any angular relation with the device within the scope of the width of the space and can be moved sufficiently far sidewise to present a clear view of the dial and the pointer so that the instrument dial is always visible from the handle end thereof.

Figs. 2 to 7 show various positions of the measuring device in spaces and various angles of the handle relative to the base to illustrate the use of the device and the pivoting of the handle for convenience in handling of the device and to clear the view of the dial on the measuring instrument.

We are aware that the present invention can be applied in devices other than the device specifically shown and described herein and that changes and modifications can be made in the structure and arrangements of parts from what is shown and described herein within the scope and intent of the appended claims. Therefore, without limiting ourselves to the precise application of our invention as shown and described nor to the precise structure and arrangements of parts as shown and described,

We claim:

1. A measuring device having a base of light weight material, opposed ears on and upstanding above said base, a measuring instrument mounted on said base, a handle for the device, also of light weight material pivoted onto the upper parts of said ears, and the axis of pivot of the handle being in the same plane as the center of the mass of said instrument and being above the center of the mass of said base to promote ease of handling of the device and of the measuring feeling of an operator in the use of the device.

2. A measuring device having a base, a contact member on a side of said base and extending upwardly therefrom, opposed ears extending upwardly of and above the top of said base, one at each side of said contact member, a handle having one end thereof pivoted onto the upper ends of both of said ears, a measuring instrument mounted on the upper face of said base between said ears, and said contact member having a substantially single line contact on the wall of a bore diametrically opposite the operating part of said measuring instrument.

3. A measuring device having a base, ears upstanding from opposite sides of and extending above said base, a contact member upstanding from a side of said base circularly intermediate said ears, a measuring instrument mounted on the upper face of said base closely spaced to and inwardly of said ears and of said contact member, a handle pivoted onto the upper ends of both of said ears, and the axis of the pivot of said handle intersecting an axis drawn vertically through the center of said base.

4. A measuring device having a base, a contact member upstanding from a side of said base and having a contact strip thereon, parallel with the axis of the device, said base having a row of pilot receiving holes through the body thereof, the axes of said holes and of said contact strip being in one plane, a measuring instrument mounted on the upper face of said base and having a pilot on the bottom thereof adapted to enter any one of said holes, and locking screws threaded into said base and each entering the corresponding one of said holes and engageable with said pilot to hold said instrument onto said base.

5. A measuring device having a base, ears upstanding from opposite sides of said base, a contact member upstanding from a side of said base, circularly intermediate said ears, and having a contact strip thereon parallel with the axis of the device, said base having a row of pilot receiving holes through the body thereof, the axes of said holes and of said contact strip being in one plane, a measuring instrument mounted on the upper face of said base, a pilot extending from the bottom of said base and adapted to enter close fittingly into any one of said holes, locking screws threaded into said base and each entering the corresponding one of said holes and engageable with said pilot to hold said instrument onto said base, and a handle for the device having one end thereof pivoted onto the upper ends of said ears so that gravity normally holds the axes of said base and of said instrument substantially vertical and the face of said instrument substantially horizontal.

6. In a measuring device, a base, an internally adjustable measuring instrument adjustably resting on the upper face of said base, a thread means for holding said instrument onto said base, a contact strip extending upwardly from said base and having the outer surface thereof parallel with the axis of said base and the outer surface thereof curved to provide a single line contact on said strip to contact the wall of a bore, said instrument having a scale on the upper end thereof and a zero mark thereon diametrically opposite said single line contact and a pointer having one end thereof movable over said scale, a contactable, endwise movable operating member for said instrument extending from a side of said instrument diametrically opposite said zero mark, an adjusting member extending from a side of said instrument to set the same so that said one end of the pointer registers with said zero mark, and a handle pivoted onto the upper part of said base, above the center of the mass thereof and substantially in a plane through the center of the mass of said instrument so that gravity normally holds the axes of said base and of said instrument substantially vertical irrespective of the angularity of the axis of said handle with the axis of the device and said scale to the top of the device.

JOHN Y. BLAZEK.
R. G. ANDERSON.